May 3, 1960  Y. PERLMAN  2,935,011
BEVERAGE-MAKING MACHINE
Filed June 10, 1958
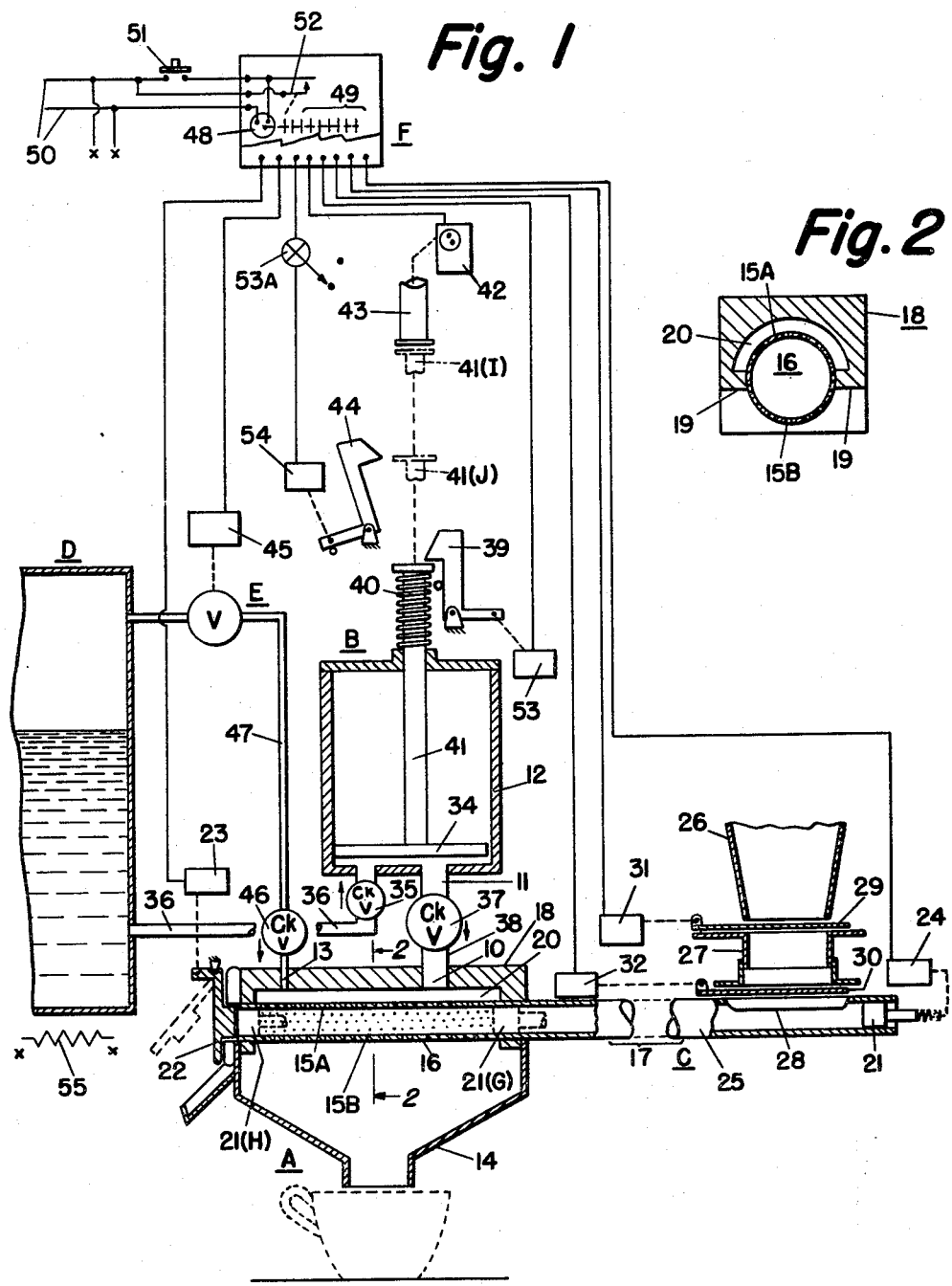

United States Patent Office 2,935,011
Patented May 3, 1960

2,935,011

BEVERAGE-MAKING MACHINE

Yaakov Perlman, Philadelphia, Pa.

Application June 10, 1958, Serial No. 741,058

3 Claims. (Cl. 99—283)

The present invention relates to a machine for making a hot beverage, such as coffee, and particularly concerns a machine which in each cycle, as initiated for example at random intervals in a vending machine, is effective to prepare and dispense a predetermined amount of the beverage.

In accordance with the present invention, for each cycle of the machine, which may be as short as five or six seconds, a measured charge of ground coffee or the like is transferred to a brewing chamber. While the charge is there subjected to pressure, live steam is supplied to the chamber for a brief interval for extraction of flavor from the charge and for conditioning the charge. During continued application of pressure, a measured volume of hot liquid is passed through the conditioned charge and out of the brewing chamber to a drinking cup or other receptacle. The spent charge is expelled from the brewing chamber before the next fresh charge is delivered thereto.

In accordance with one feature of the invention, the transfer of the charge to the brewing chamber, the application of pressure to the charge during brewing, and the expulsion of the spent charge after brewing is effected by a tube and piston arrangement. The tube has, within the brewing chamber, a perforated section for retaining the charge during brewing. This section is terminated by a movable closure which is opened, after a brewing operation, for expulsion of the spent charge by the piston which transferred the charge as a fresh charge to the perforated section and applied pressure to the charge during the brewing operation.

In accordance with another feature of the invention, the hot liquid is supplied to the brewing chamber by a pump whose piston in the idle interval between successive brewing cycles is held in its discharge position. During a brewing cycle, the piston is released for movement by a means capable of moving the piston through its full stroke. When less than a full cup of beverage is desired, the movement of the piston is arrested before a full stroke is attained. Thus during a cycle, the piston draws into the cylinder a fresh supply of hot liquid corresponding in volume with a full cup or a demitasse, as preselected. In either event, whether a full cup or a demitasse has been preselected, the piston is returned to discharge position by a powered actuator normally decoupled from the piston. The piston is relatched in its discharge position and the actuator returns to its original disengaged position.

In accordance with another feature of the invention, the measurement of the successive charges of coffee or the like is effected by a measuring flask disposed between the supply hopper and the inlet of the aforesaid piston and tube arrangement. The supply of coffee from the hopper to the measuring flask and of discharge of the measured charge from the flask to the transfer tube may be effected by valves or gates respectively disposed at the upper and lower ends of the measuring flask.

The invention further resides in features of construction, combination and arrangement hereinafter described and claimed.

For a more detailed understanding of the invention, reference is made in the following description to the attached drawings in which:

Fig. 1 diagrammatically illustrates, with certain parts in section, a beverage-making machine; and Fig. 2 is a sectional view taken on line 2—2 of Fig. 1.

In the preferred form of the invention shown in the drawings, the principal components are the brewing chamber A, a pumping device B for supplying hot liquid to the brewing chamber; a transport mechanism C for feeding coffee or the like to the brewing chamber; a boiler D providing a continuous supply of hot liquid, such as water and steam; a steam control valve E and a timer F.

The brewing chamber is provided with an inlet 10 connected to the outlet 11 of the pump cylinder 12 and with an inlet 13 connected to the outlet of the steam valve E. Between its inlets 10, 13 and its discharge spout 14, the brewing chamber is provided with two apertured partitions 15A, 15B between which a charge of coffee or the like is confined during a brewing cycle. In the particular arrangement shown, these partitions are formed by the upper and lower sides of the perforated section 16 of a feed tube 17 which may be of circular or other cross-sectional shape. The openings ends of tube section 16 are snugly received by openings in opposite ends of the block 18 which forms the body of the brewing chamber. The block 18 is recessed to leave a space 20 above the upper side 15A of the tube section 16. The perforated section 16 of tube 17 is engaged by the inwardly directed flanges 19, 19 of the block 18 (Fig. 2). Thus, the steam and hot water admitted to the space 20 must pass through the upper perforated partition 14A, through the charge of coffee in that section of the tube, and thence through the lower perforated partition wall 15B to the discharge spout 14.

While the steam and boiling water are being supplied to the brewing chamber, the charge within the perforated section of the tube is subjected to a steady or pulsating squeezing pressure by piston 21, which at that time is in approximately the dotted-line position 21(G).

During the brewing cycle, the left-hand end of the perforated tube section 16 is closed by the door 22 or equivalent closure means. After completion of the brewing operation, the door 22 is opened by its actuator 23, whereupon the piston is moved to the dotted-line position 21(H) by its actuator 24 to expel the spent charge of coffee from the brewing chamber. Before initiation of the next brewing cycle, the piston 21 is moved to the right externally of the brewing chamber through the imperforate section 25 of tube 17 to the full-line position shown in Fig. 1. Before the piston 21 is next moved to the dotted line position by its actuator, a measured fresh charge is supplied to the imperforate section of tube 25 from a suitable supply source of ground coffee or the like exemplified by the hopper 26.

Measurement and transfer of the proper amount of coffee is effected by means comprising the measuring flask 27 disposed between the hopper 26 and the inlet opening 28 of tube 17. The measuring flask 27 is provided with an inlet slide valve 29 and an outlet slide valve 30. While the outlet valve 30 is closed, the inlet valve 29 is opened by its actuator 31 to permit filling of the flask from the hopper. As indicated, the flask may comprise two telescoping sections which can be adjusted to preset its volume. Thus, when the valve 29 returns to the closed position shown, there is a predetermined amount of coffee in flask 27, this amount constituting a measured charge. When the valve 30 is thereafter opened by its actuator 32, the measured contents of the flask 27 are discharged into the transfer tube 17 in advance of the piston 21.

In the interval between successive cycles of the machine, the piston 34 of pump B is idle in the discharge position shown in Fig. 1. The check valve 35 in the inlet line 36 from the boiler B permits entry of hot water into the cylinder, but with the cylinder in the discharge position, the amount is insubstantial. Flow of water to the brewing chamber A is prevented by the check valve 37 in the discharge connection 38 of pump B.

During a brewing cycle, the latch 39 is released, so permitting the piston 34 to be moved from its discharge position by the biasing spring 40 or equivalent. Except as hereinafter provided, the piston 34 will move through its full stroke for which the upper end of the piston rod 41 will have the position indicated by 41(I). During movement to this position, the piston draws into the cylinder 12 from the boiler D a volume of hot water corresponding with a full cup. Shortly thereafter, the piston is returned to its discharge position by the actuator 42 whose plunger 43 is normally in the full-line position shown in Fig. 1. The piston 41 is relatched in its discharge position by latch 39 whereupon the actuator plunger 43 returns to its original position. During the discharge stroke of the piston, the hot water freshly drawn from the boiler is forced into the brewing chamber and through the charge of ground coffee constrained within the chamber by the perforated section 16 of tube 17. Thus, for the cycle described, a full cup of freshly prepared coffee is delivered from the discharge spout 14 of the brewing chamber.

When a half cup of strong coffee is desired, it is provided, as hereinafter described, that a second latch 44 shall be moved into the path of the piston rod 41 suitably before the latch 39 is released. Thus, the piston 34 is permitted to move only about half way of its full stroke, the upper end of the piston rod 41 then being arrested in the dotted-line position 41(J) by the latch 44. Thus, for this cycle the amount of hot water drawn from the boiler is only about one-half cup. With the piston arrested in this intermediate position, the actuator plunger 43 moves a substantial distance without engaging the piston rod: for the remainder of the down stroke of the actuator plunger, it returns the piston to its original position to discharge from the pump B an amount of freshly drawn hot water corresponding with a half cup. As before described, the piston is relatched in the discharge position and the actuator plunger 43 returns to the full-line position shown in Fig. 1.

During the discharge stroke of the piston 34, whether it be a full stroke or a half stroke, the check valve 35 closes to prevent any of the water in the pump cylinder from being forced back into the boiler and the check valve 37 opens freely to permit the water in the pump cylinder to pass into the brewing chamber. The check valve 37 also serves as a safety valve should the pressure in the boiler D exceed a safe limit or should the water level in the boiler fall below the pump connection 36.

For quick extraction of flavor from the charge and for conditioning the charge for best further extraction of flavor by the boiling water, steam is first admitted to the brewing chamber for a brief early interval in the brewing cycle. Such admission is effected by activation of the actuator 45 of the steam valve E. The check valve 46 in the steam line 47 is opened by the pressure of the incoming steam to allow it to pass into the space 20 of the brewing chamber A. Upon re-closure of steam valve E, the check valve 46 re-closes. Subjecting the pressurized charge to live steam is very effective in extraction of flavor from the charge and softens it for better extraction of flavor by the boiling water immediately thereafter passed into the brewing chamber.

The duration and sequence of the operations above described as occurring during a cycle of the machine are controlled by the timer F which upon completion of the cycle shuts itself off and remains in standby condition until the next cycle is initiated as by an authorized attendant, or in the case of an unattended vending machine, by deposit of a coin. By way of example, the timer F may comprise a motor 48 for driving a series of control cams 49. So long as the machine is on standby, the motor is disconnected from the power lines 50 and all of the cams are in position corresponding with an inactive state of the various actuators.

When the switch 51 is momentarily closed to initiate a cycle of the machine, the motor 48 is energized to rotate the cams 49 through one revolution. One of the cams closes the lock-in switch 52 and maintains it closed until completion of a cycle of the machine. The other cams control switches or valves respectively associated with the actuators of the various above described components of the machine. Whether switches or valves are used depends upon whether the actuators are of electrical type or are of hydraulic or pneumatic type.

In a preferred cycle of operation, the actuator 32 is energized near the beginning of the cycle to open gate valve 30 for dumping of the measured charge in flask 27 into the tube 17. After a very brief interval, for example, less than one second, actuator 32 is deenergized and substantially concurrently therewith the actuator 24 is energized. The piston 21 thereupon moves the fresh charge into the perforated section 16 of tube 17. Actuator 24 remains energized for substantially the remainder of the cycle to maintain pressure on the charge and to expel it when the door 22 is opened late in the cycle. At about the time of re-closure of the dump valve 30, the actuator 53 of latch 39 is momentarily energized to release the piston 34 for upward movement by spring 40. While the piston is drawing boiling water into cylinder 12, the actuator 45 is energized for a few seconds to open the steam valve E for a corresponding period of time. Shortly before the steam valve E re-closes, the actuator 42 is energized for movement of rod 43 from and back to the position shown in Fig. 1. During the downward movement of rod 43, it returns the piston 34 to its latched discharge position to force the boiling water through the conditioned charge in the brewing chamber. Near the end of the cycle, the actuator 23 is energized to open the door 22 so to permit the piston 21 to expel the spent charge. At any suitable time during the cycle after re-closure of the slide valve 30, the actuator 31 is energized for a brief time to open the slide valve 29 to permit flow of material from the hopper 26 into the measuring flask 27. The time required to perform all these operations may be very brief, of the order of five or six seconds. When it is desired to obtain only a demitasse, the cycle of operations is the same as before except that before the cycle is initiated, the selector switch or valve 53A is moved to such position that the actuator 54 of latch 44 is energized during the cycle. Such energization is effected before energization of the actuator 53 of latch 39 so that the piston rod 41 moves only to the position 41(J) instead of to the full-stroke position 41(I).

When the boiler D is provided with an electrical heater 55, the heater is continuously connected to the power line 50 and is independent of the timer F or its switch 51 so that there is always available an ample supply of boiling water and steam. When the boiler heater is of other type, it shall be understood that it is in continuous operation. Whether the heat supply is electricity, gas or the like, the source may be controlled, as by a thermostat not shown, to maintain the water or other liquid at boiling temperature.

It shall be understood the invention is not limited to the particular embodiment specifically described, and that changes and modifications may be made within the scope of the appended claims. For example, the hopper 26 and flask 27 may be one unit of a group for respectively supplying coffee, tea, cocoa, soup powder or the like to the feed tube 17.

What is claimed is:

1. A machine operative during its cycle to prepare and dispense an individual serving of hot coffee brewed during the cycle comprising timing means normally on standby and energizable to perform a self-terminated cycle, a brewing chamber, first means controlled by said timing means during its cycle to deliver a fresh charge of ground coffee to said brewing chamber to confine and compress said charge during brewing and to empty said brewing chamber of ground coffee, a boiler continuously providing a supply of boiling water, and a second means controlled by said timing means during its cycle to pass a predetermined volume of boiling water through the fresh charge of ground coffee in said brewing chamber comprising a cylinder, a piston in said cylinder, a first latching means for releasably holding said piston in its discharge position between successive cycles of said timing means, spring means for biasing said piston away from its discharge position, means controlled by said timing means during its cycle to release said first latching means to permit said spring means to move said piston to draw a predetermined volume of boiling liquid from said boiler into said cylinder, a powered actuator controlled by said timing means during its cycle to return said piston to its latched discharge position for delivery of said predetermined volume of boiling liquid to said brewing chamber, a second latching means for arresting said motion of said piston by said spring means at a position intermediate the full-stroke of said powered actuator, actuating means controllable by said timing means during its cycle for moving said second latching means to its arresting position, and selectively operable means for presetting or disabling said actuating means of said second latching means to provide in the ensuing cycle of the machine a length of piston stroke corresponding either with a demitasse or a full cup in dependence upon the selection made.

2. A machine for preparing and dispensing an individual serving of hot liquid coffee comprising timing means normally on standby and effective upon energization to perform a self-terminated cycle of operation within a predetermined period; a brewing chamber which is emptied of liquid and ground coffee for each cycle of said timing means, said chamber having a closed top with ports for admission of steam and boiling water, a tube having a perforate section extending across said chamber and cooperating with said closed top thereof to define a confined space, a movable closure external to said chamber and normally closing one end of said tube, actuating means for said movable closure controlled by said timing means to open said end of said tube at a predetermined time in the cycle of said timing means, feeding means including a piston whose stroke extends through said perforate section to said movable closure, actuating means for said piston controlled by said timing means during its cycle to deliver a fresh charge of ground coffee into the empty perforate section of said tube, to press said charge against said movable closure during a predetermined brewing period terminating when said movable closure is opened by its timed actuating means, and to re-empty said tube of ground coffee by completion of its stroke as permitted by opening of said movable closure, means controlled by said timing means to supply steam to said confined space for a timed initial fraction of said brewing period, and means controlled by said timing means during its cycle to force a predetermined volume of boiling water through said confined space for passage through said charge as conditioned by the steam and while subjected to pressure by said piston.

3. A machine for preparing and dispensing an individual serving of hot liquid coffee comprising timing means normally on standby and effective upon energization to perform a self-terminated cycle of operation within a predetermined period, a brewing chamber which is emptied of liquid and ground coffee for each cycle of said timing means, said chamber having a closed top with admission ports, a tube having a perforate section extending across said chamber and cooperating with said closed top thereof to define a confined space, a movable closure external to said chamber normally closing one end of said tube and actuated to open said end of said tube at a predetermined time in the cycle of said timing means, feeding means including a piston whose stroke extends through said perforate section to said movable closure, actuating means for said piston controlled by said timing means during its cycle to deliver a fresh charge of ground coffee into the empty perforate section of said tube, to press said charge against said movable closure during a brewing period predetermined by said timing means, and to re-empty said tube of ground coffee by completion of its stroke, and means controlled by said timing means during its cycle to force a predetermined volume of boiling water through said admission ports into said confined spaced and thence through said charge of ground coffee while subjected to pressure by said piston.

References Cited in the file of this patent

UNITED STATES PATENTS

| | | |
|---|---|---|
| 389,079 | Huff | Sept. 4, 1888 |
| 455,832 | Muller | July 14, 1891 |
| 1,665,728 | Canright | Apr. 10, 1928 |
| 2,014,325 | Grilli | Sept. 10, 1935 |
| 2,203,666 | Bonotto | June 11, 1940 |
| 2,381,965 | Berry | Aug. 14, 1945 |
| 2,387,871 | Baumann | Oct. 30, 1945 |
| 2,515,730 | Ornfelt | July 18, 1950 |
| 2,562,563 | McBean | July 31, 1951 |
| 2,629,663 | Fogler | Feb. 24, 1953 |
| 2,822,746 | Schwall | Feb. 11, 1958 |
| 2,854,917 | Lafitte | Oct. 7, 1958 |

FOREIGN PATENTS

| | | |
|---|---|---|
| 417,281 | Germany | Aug. 11, 1925 |
| 436,322 | Germany | Oct. 29, 1926 |
| 341,581 | Great Britain | Jan. 22, 1931 |
| 583,943 | Germany | Mar. 24, 1934 |
| 177,225 | Austria | June 15, 1953 |
| 780,996 | Great Britain | Aug. 14, 1957 |